United States Patent
Kim et al.

(10) Patent No.: US 10,084,616 B2
(45) Date of Patent: Sep. 25, 2018

(54) PEAK CANCELLATION-CREST FACTOR REDUCTION DEVICE, PEAK-TO-AVERAGE POWER RATIO REDUCTION METHOD, AND PEAK VALUE DETERMINATION DEVICE

(71) Applicant: SOLiD, INC., Seongnam-si, Gyeonggi-do (KR)

(72) Inventors: Doyoon Kim, Seongnam-si (KR); Kwangnam Seo, Guri-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/459,774

(22) Filed: Mar. 15, 2017

(65) Prior Publication Data

US 2017/0187550 A1    Jun. 29, 2017

Related U.S. Application Data

(63) Continuation-in-part of application No. PCT/KR2014/008669, filed on Sep. 17, 2014.

(30) Foreign Application Priority Data

Sep. 15, 2014  (KR) .................. 10-2014-0122158

(51) Int. Cl.
    *H04L 25/02*    (2006.01)
    *H04L 27/26*    (2006.01)

(52) U.S. Cl.
    CPC ...... *H04L 25/0262* (2013.01); *H04L 27/2623* (2013.01)

(58) Field of Classification Search
    CPC ............................. H04L 25/02; H04L 27/26
    See application file for complete search history.

(56) References Cited

U.S. PATENT DOCUMENTS

| 9,485,129 | B1 * | 11/2016 | Cope | ................. | H04L 27/2623 |
| 2002/0197970 | A1 * | 12/2002 | Jian | ...................... | H04B 1/707 |
| | | | | | 455/245.2 |

(Continued)

FOREIGN PATENT DOCUMENTS

CN            102739592 A      10/2012

OTHER PUBLICATIONS

International Search Report for application No. PCT/KR2014/008669 dated May 11, 2015.

(Continued)

*Primary Examiner* — Jaison Joseph
(74) *Attorney, Agent, or Firm* — Sughrue Mion, PLLC

(57) ABSTRACT

A peak cancellation-crest factor reduction (PC-CFR) device includes a clipping unit configured to output a clipping error signal by clipping amplitude values of a first baseband complex signal based on a predetermined threshold value; a peak value determination unit configured to receive the clipping error signal, and determine a first amplitude value as a peak value when the first amplitude value is greater than a second amplitude value input before the first amplitude value and a third amplitude value input after the first amplitude value among amplitude values of the clipping error signal; a cancellation pulse generator (CPG) allocation unit configured to allocate the peak value to a CPG; and a subtractor configured to subtract a cancellation pulse generated from the CPG from the first baseband complex signal and output a second baseband complex signal with a reduced peak-to-average power ratio (PAPR).

11 Claims, 6 Drawing Sheets

(56) References Cited

U.S. PATENT DOCUMENTS

| | | | | |
|---|---|---|---|---|
| 2007/0140376 A1* | 6/2007 | Kang | ............... | H04L 27/2623 |
| | | | | 375/296 |
| 2010/0010650 A1* | 1/2010 | Ooue | ............... | G11B 20/10009 |
| | | | | 700/94 |
| 2011/0092173 A1* | 4/2011 | McCallister | ......... | H03F 1/3247 |
| | | | | 455/108 |
| 2012/0093209 A1* | 4/2012 | Schmidt | ............ | H04L 27/2624 |
| | | | | 375/224 |
| 2013/0022148 A1* | 1/2013 | Sagi | ............ | H04L 27/361 |
| | | | | 375/296 |
| 2013/0142239 A1* | 6/2013 | Kawasaki | ............ | H04L 27/368 |
| | | | | 375/224 |
| 2013/0251055 A1* | 9/2013 | Yu | ............ | H04L 5/0007 |
| | | | | 375/260 |
| 2014/0341316 A1* | 11/2014 | Yu | ............ | H04L 27/2624 |
| | | | | 375/296 |
| 2015/0200797 A1* | 7/2015 | McCallister | ........ | H04L 27/2623 |
| | | | | 370/329 |
| 2015/0349994 A1* | 12/2015 | Feng | ............ | H04L 1/20 |
| | | | | 375/260 |
| 2016/0337155 A1* | 11/2016 | Martynovich | ............ | H04B 1/04 |

OTHER PUBLICATIONS

Written Opinion for application No. PCT/KR2014/008669 dated May 11, 2015.

* cited by examiner

PEAK CANCELLATION-CREST FACTOR REDUCTION DEVICE, PEAK-TO-AVERAGE POWER RATIO REDUCTION METHOD, AND PEAK VALUE DETERMINATION DEVICE

CROSS-REFERENCE TO RELATED APPLICATIONS

This application is a Continuation-In-Part of PCT International Application No. PCT/KR2014/008669, filed Sep. 17, 2014, and claims priority from Korean Patent Applications No. 10-2014-0122158 filed Sep. 15, 2014, the contents of which are incorporated herein by reference in their entireties.

BACKGROUND

1. Field

One or more example embodiments relate to a peak cancellation-crest factor reduction (PC-CFR) device, a peak-to-average power ratio (PAPR) reduction method, and a peak value determination device, and more particularly, to a PC-CFR device for reducing PAPR of a baseband signal, a PAPR reduction method, and a device for determining a peak value of a predetermined signal.

2. Description of the Related Art

Signals transmitted and received in a wireless communication system do not have a constant envelope. Accordingly, when these signals are overlapped in the same phase, peak power in a time domain is further increased to have a high peak-to-average power ratio (PAPR). A repeater needs to use an amplifier having a high linear characteristic to accommodate the signals having the high PAPR, which increases the price. In addition, the high linear characteristic accompanies an increase in power consumption, resulting in a reduction in efficiency of the wireless communication system.

Therefore, there is a need to reduce the PAPR of the signal to improve the efficiency of the wireless communication system, and crest factor reduction (CFR) is a commonly used method for this. The CFR reduces a magnitude of the signal within a range that does not affect a frequency band when a large signal occurs instantaneously in a baseband signal. Clipping of peak signals is required for the CFR, which may cause spectral degradation by causing discontinuity in the signal.

Therefore, peak cancellation-crest factor reduction (PC-CFR), which is excellent in performance and easy to implement, is widely used. The PC-CFR is a method of canceling a peak of a signal using a cancellation pulse generated by a cancellation pulse generator (CPG).

An operation process of a conventional PC-CFR is as below. Conventionally, a cancellation pulse is added to a position of a signal exceeding a predetermined threshold so as not to exceed the threshold. The cancellation pulse is generated in the CPG. The CPG selects a peak among clipping signals (input signals having a large PAPR) greater than the threshold, and generates a cancellation pulse based on a position, a magnitude, and phase information of the peak.

A CPG may produce one cancellation pulse for peak signal 1. Also, since the CPG in operation cannot generate a cancellation pulse for another peak signal 2 while generating one cancellation pulse, another CPG is allocated to the peak signal 2. In other words, another CPG (CPG2) is required to cancel the peak signal 2 that may appear while CPG1 produces a cancellation pulse for the peak signal 1, and the number of CPGs can be determined according to the system. However, as the number of CPGs increases, more capacity is needed to implement functions. Therefore, the number of CPGs cannot be increased indefinitely.

A case where there are four CPGs for generating cancellation pulses will be described as an example. If there are 4 CPGs, up to four CPGs may be operated at a time and there are four cancellation pulses that can operate continuously. The reason why there are many CPGs is to process peaks at the same time when the peaks are detected at various positions as described above. The cancellation pulses produced by the four CPGs are summed together and added by a magnitude opposite to an original signal so that the peaks may be canceled from the original signal. That is, a cancellation pulse is subtracted at the corresponding position in order to cancel peaks generated in input signals.

Since the PC-CFR needs to allocate a limited CPG to peak signals, a cancellation operation for the peak signals cannot be performed when there is no CPG to allocate. Due to the above characteristics, at least two-stages of CFR generally needed, and thus resources and delay increase.

SUMMARY

One or more example embodiments include a peak cancellation-crest factor reduction (PC-CFR) device, a peak-to-average power ratio (PAPR) reduction method, and a peak value determination device, which perform appropriate peak detection on a clipping signal, thereby reducing resources and delay.

One or more example embodiments include a PC-CFR device, a PAPR reduction method, and a peak value determination device, which more accurately detect a peak that is not detected in a conventional PC-CFR.

According to an aspect of the inventive concept, there is provided a peak cancellation-crest factor reduction (PC-CFR) device includes a clipping unit configured to output a clipping error signal by clipping amplitude values of a first baseband complex signal based on a predetermined threshold value; a peak value determination unit configured to receive the clipping error signal, and determine a first amplitude value as a peak value when the first amplitude value is greater than a second amplitude value input before the first amplitude value and a third amplitude value input after the first amplitude value among amplitude values of the clipping error signal; a cancellation pulse generator (CPG) allocation unit configured to allocate the peak value to a CPG; and a subtractor configured to subtract a cancellation pulse generated from the CPG from the first baseband complex signal and output a second baseband complex signal with a reduced peak-to-average power ratio (PAPR).

According to an exemplary embodiment, the peak value determination unit may include odd-numbered flip-flops receiving the amplitude values of the clipping error signal in time sequence; and a determination unit configured to determine the first amplitude value as the peak value when a magnitude of the first amplitude value stored in a flip-flop located in the middle of the odd-numbered flip-flops is the greatest.

According to an exemplary embodiment, the peak value determination unit may include a 2:1 multiplexer receiving the first amplitude value, which is stored in the flip-flop located in the middle of the odd-numbered flip-flops, and 0, wherein the peak value determination unit may be configured to output a control signal for controlling the 2:1 multiplexer such that the first amplitude value is output from the 2:1 multiplexer to the CPG allocation unit when a magnitude of the first amplitude value is the greatest.

According to an exemplary embodiment, the clipping unit may include a comparison unit configured to compare a magnitude of the first baseband complex signal with the threshold value; a CORDIC unit configured to output a phase signal corresponding to a phase of the first baseband complex signal; a multiplier configured to multiply the threshold value and the phase signal; and a 2:1 multiplexer configured to receive the first baseband complex signal and the threshold value multiplied by the phase signal, wherein the comparison unit may be configured to transmit a control signal to the 2:1 multiplexer based on the comparison result so that the 2:1 multiplexer selectively outputs the first baseband complex signal and the threshold value multiplied by the phase signal.

According to an exemplary embodiment, the 2:1 multiplexer may output a clipping signal including at least portion of the first baseband complex signal and the threshold value multiplied by the phase signal, wherein the clipping unit may further include a subtractor configured to subtract the clipping signal from the first baseband complex signal and output the clipping error signal.

According to another aspect of the inventive concept, there is provided a peak-to-average power ratio (PAPR) reduction method includes outputting a clipping error signal by clipping amplitude values of a first baseband complex signal based on a predetermined threshold value; determining a first amplitude value as a peak value when the first amplitude value is greater than amplitude values input before and after the first amplitude value among amplitude values of the clipping error signal; generating a cancellation pulse corresponding to the peak value; and subtracting the cancellation pulse from the first baseband complex signal to output a second baseband complex signal with a reduced PAPR.

According to an exemplary embodiment, the determining the first amplitude value as a peak value may include receiving the amplitude values of the clipping error signal through odd-numbered flip-flops; and determining the first amplitude value as the peak value when a magnitude of the first amplitude value stored in a flip-flop located in the middle of the odd-numbered flip-flops is the greatest.

According to an exemplary embodiment, the determining the first amplitude value as a peak value may include inputting the first amplitude value, which is stored in the flip-flop located in the middle of the odd-numbered flip-flops, and 0 to a 2:1 multiplexer; and outputting the first amplitude value as the peak value through the 2:1 multiplexer when a magnitude of the first amplitude value is the greatest.

According to an exemplary embodiment, the outputting the clipping error signal may include outputting a phase signal corresponding to a phase of the first baseband complex signal; and multiplying the threshold value and the phase signal; receiving the first baseband complex signal and the threshold value multiplied by the phase signal; comparing a magnitude of the first baseband complex signal with the threshold value; outputting selectively the first baseband complex signal and the threshold value multiplied by the phase signal as a clipping signal based on the comparison result; and outputting the clipping error signal by subtracting the clipping signal from the first baseband complex signal.

According to still another aspect of the inventive concept, there is provided a peak value determination device includes a plurality of flip-flops configured to receive a plurality of amplitude values included in a predetermined signal in time sequence; and a determination unit configured to determine a first amplitude value as a peak value when the first amplitude value is greater than a second amplitude value input before the first amplitude value and a third amplitude value input after the first amplitude value among the plurality of amplitude values stored in the plurality of flip-flops.

According to an exemplary embodiment, the plurality of flip-flops may be odd, and the peak value determination unit may further include a 2:1 multiplexer receiving the first amplitude value, which is stored in a flip-flop located in the middle of the odd-numbered flip-flops, and 0, wherein the determination unit may be configured to output a control signal for controlling the 2:1 multiplexer such that the first amplitude value is output from the 2:1 multiplexer when a magnitude of the first amplitude value is the greatest.

According to an example embodiment of the inventive concept, a PC-CFR device, a PAPR reduction method, and a peak value determination device may perform appropriate peak detection on a clipping signal, thereby reducing resources and delay.

Furthermore, the PC-CFR device, the PAPR reduction method, and the peak value determination device may more accurately detect a peak that is not detected in a conventional PC-CFR.

BRIEF DESCRIPTION OF THE FIGURES

These and/or other aspects will become apparent and more readily appreciated from the following description of the example embodiments, taken in conjunction with the accompanying drawings in which.

DETAILED DESCRIPTION OF EXEMPLARY EMBODIMENTS

Figure 1:
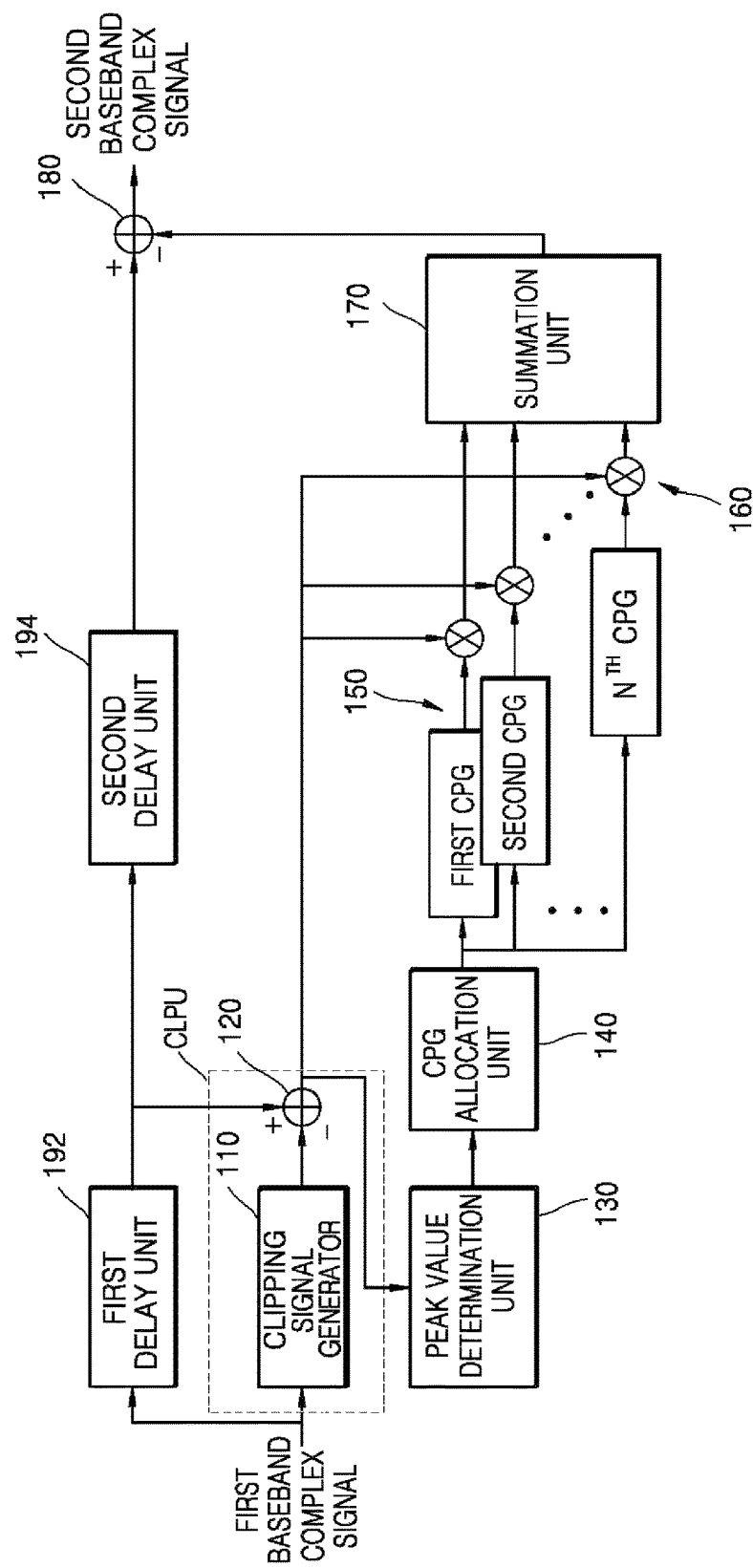
FIG. 1 is a view of a configuration of a peak cancellation-crest factor reduction (PC-CFR) device according to an example embodiment of the inventive concept.

Advantages and features of the example embodiments, and implementation methods thereof will be clarified through following embodiments described with reference to the accompanying drawings. In this regard, an example embodiment of the inventive concept may have different forms and should not be construed as being limited to the descriptions set forth herein. Accordingly, the example embodiments are merely described below, by referring to the figures, to explain aspects. Like reference numerals refer to like elements throughout.

A term "unit" used in the specification indicates a software or hardware component such as field-programmable logic array (FPLA) and application-specific integrated circuit (ASIC), and the "unit" performs a particular function. However, the "unit" is not limited to software or hardware. The "unit" may be configured to be stored in an addressable storing medium or to play back one or more processors. Accordingly, the "unit" may include, for example, software components, object-oriented software components, components such as class components and task components, processors, formulas, attributes, procedures, subroutines, segments of program codes, drivers, firmware, micro codes, circuits, data, database, data structures, tables, arrays and variables. Functions provided in components and "units" may be combined into a smaller number of components and "units", or may be further divided into additional components and "units."

FIG. 1 is a view of a configuration of a peak cancellation-crest factor reduction (PC-CFR) device according to an example embodiment of the inventive concept.

Referring to FIG. 1, the PC-CFR device according to an example embodiment of the inventive concept may include a clipping unit CLPU, a peak value determination unit 130, a cancellation pulse generator (CPG) allocation unit 140, at least one CPG 150, and a subtractor 180. Furthermore, the PC-CFR device may further include a first delay unit 192, a second delay unit 194, at least one multiplier 160, and a summation unit 170.

The clipping unit CLPU clips amplitude values of an input first baseband complex signal based on a predetermined threshold value and outputs a clipping error signal. The clipping unit CLPU may include a clipping signal generator 110 and a subtractor 120. The clipping signal generator 110 may generate a clipping signal, and the subtractor 120 may output the clipping error signal by using the first baseband complex signal and the clipping signal. The clipping unit CLPU will be described in detail with reference to FIG. 2.

The peak value determination unit 130 determines a peak value based on the clipping error signal. In more detail, the peak value determination unit 130 may receive a plurality of amplitude values included in the clipping error signal in time sequence, and the peak value determination unit 130 may determine a first amplitude value as the peak value when the first amplitude value is greater than a second amplitude value input before the first amplitude value and a third amplitude value input after the first amplitude value among the plurality of amplitude values. For example, when an amplitude value input at a point in time t is 3, and amplitude values input at points in time t−1 and t+1 are respectively 2 and 1, the peak value determination unit 130 may determine the first amplitude value input at the point in time t as a peak value. This is because amplitude values input at points in time before and after a peak value are less than the peak value.

The CPG allocation unit 140 allocates the determined peak value to the CPG 150. The CPG allocation unit 140 may allocate the peak value to the CPG 150 that is not currently operating.

The CPG 150 generates a cancellation pulse corresponding to the peak value and the generated cancellation pulse is multiplied by a predetermined weight in the multiplier 160 connected to the CPG 150. The predetermined weight may be determined based on the clipping error signal output from the clipping unit CLPU.

The first delay unit 192 delays the first baseband complex signal and inputs the delayed first baseband complex signal to the subtractor 120 while the first baseband complex signal is processed by the clipping unit CLPU. As will be described later below, the clipping signal generator 110 of the clipping unit CLPU generates the clipping signal by outputting a threshold value in which a phase of the first baseband complex signal is reflected when an amplitude value of the first baseband complex signal is greater than the threshold, and the first baseband complex signal as it is when the amplitude value is less than the threshold. The subtractor 120 of the clipping unit CLPU may cancel the clipping signal from the delayed first baseband complex signal and output a value other than 0 only in a peak point as the clipping error signal.

Cancellation pulses generated from the at least one CPG 150 are summed by the summation unit 170 and input to the subtractor 180. If the CPG 150 is only one, the summation unit 170 may not be included in the PC-CFR device.

The subtractor 180 subtracts the cancellation pulse generated by the CPG 150 from the first baseband complex signal and outputs a second baseband complex signal with a reduced PAPR. The first baseband complex signal that is delayed primarily by the first delay unit 192 may be delayed secondarily by the second delay unit 194 and input to the subtractor 180.

A conventional PC-CFR device cannot detect a peak smoothly by determining only the maximum value among amplitude values input during a predetermined time interval as a peak value. In other words, since the conventional peak detection technique determines the maximum value among sets of amplitude values that remain above a threshold as a peak value, continuous peak values may not be detected when peak values are continuous in the sets of amplitude values. To this end, the conventional PC-CFR device requires a plurality of stages of processing operations and has to know the last position of the sets of amplitude values beforehand, and thus delay increases.

On the other hand, the PC-CFR device according to an example embodiment of the inventive concept determines a first amplitude value as a peak value when the first amplitude value is greater than amplitude values input before and after the first amplitude value among a plurality of amplitude values input in time sequence. Therefore, it is possible to overcome problems that may occur in the conventional PC-CFR device.

Figure 2:
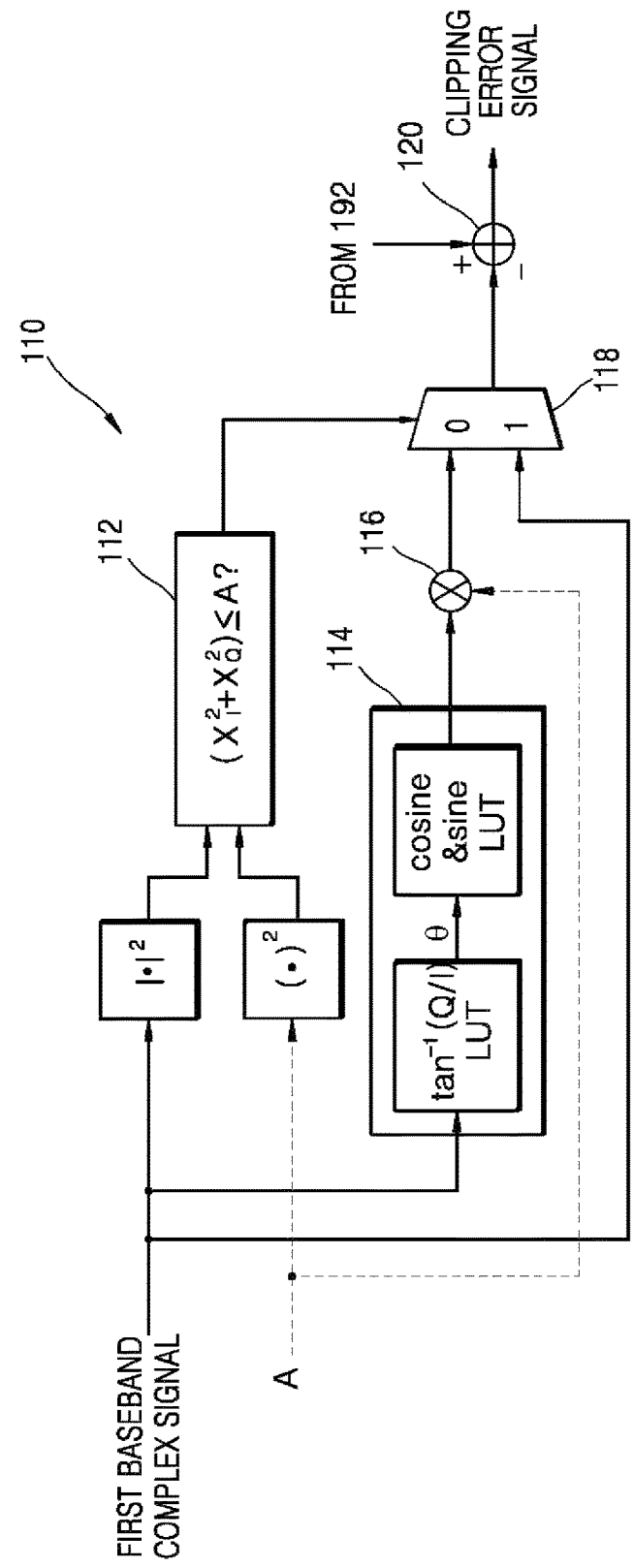
FIG. 2 is a detailed view of a clipping unit in FIG. 1.

FIG. 2 is a detailed view of the clipping unit CLPU in FIG. 1.

The clipping unit CLPU may include a clipping signal generator 110 and a subtractor 120. The clipping signal generator 110 may include a comparison unit 112, a CORDIC unit 114, a multiplier 116, and a 2:1 multiplexer 118.

The comparison unit 112 compares a magnitude of a first baseband complex signal with that of a threshold value A. The comparison unit 112 may transmit a control signal according to the comparison result of magnitudes of the first baseband complex signal and the threshold value A to the 2:1 multiplexer 118.

The CORDIC unit 114 outputs a phase signal of the first baseband complex signal. To this end, the CORDIC unit 114 may include an arctangent lookup table, a sine lookup table, and a cosine lookup table. The CORDIC unit 114 determines a phase of the first baseband complex signal including I (In-phase) component and Q (Quadrature) component using the arctangent lookup table, and outputs the phase signal.

The phase signal is input to the multiplier 116 connected to the CORDIC unit 114 and the threshold value A is input to the multiplier 116 to be multiplied by the phase signal.

The 2:1 multiplexer 118 receives the threshold value A multiplied by the phase signal and the first baseband complex signal.

When the first baseband complex signal is greater than the threshold value A, the comparison unit 112 transmits a first control signal for outputting the threshold value A multiplied by the phase signal to the 2:1 multiplexer 118. When the first baseband complex signal is less than the threshold value A, the comparator 112 transmits a second control signal for outputting the first baseband complex signal to the 2:1 multiplexer 118. Therefore, the clipping signal including the threshold value A multiplied by the phase signal and at least portion of the first baseband complex signal may be generated.

FIG. 2 shows that the threshold value A multiplied by the phase signal is input to the 2:1 multiplexer 118. However, the threshold value A multiplied by I component may be input to another 2:1 multiplexer and the threshold value A multiplied by Q component may be input to the other 2:1 multiplexer. In this case, the first and second control signals output from the comparison unit 112 may be transmitted to another 2:1 multiplexer and the other 2:1 multiplexer.

The subtractor 120 may output the clipping error signal by subtracting the clipping signal from the first baseband complex signal.

Figure 3:
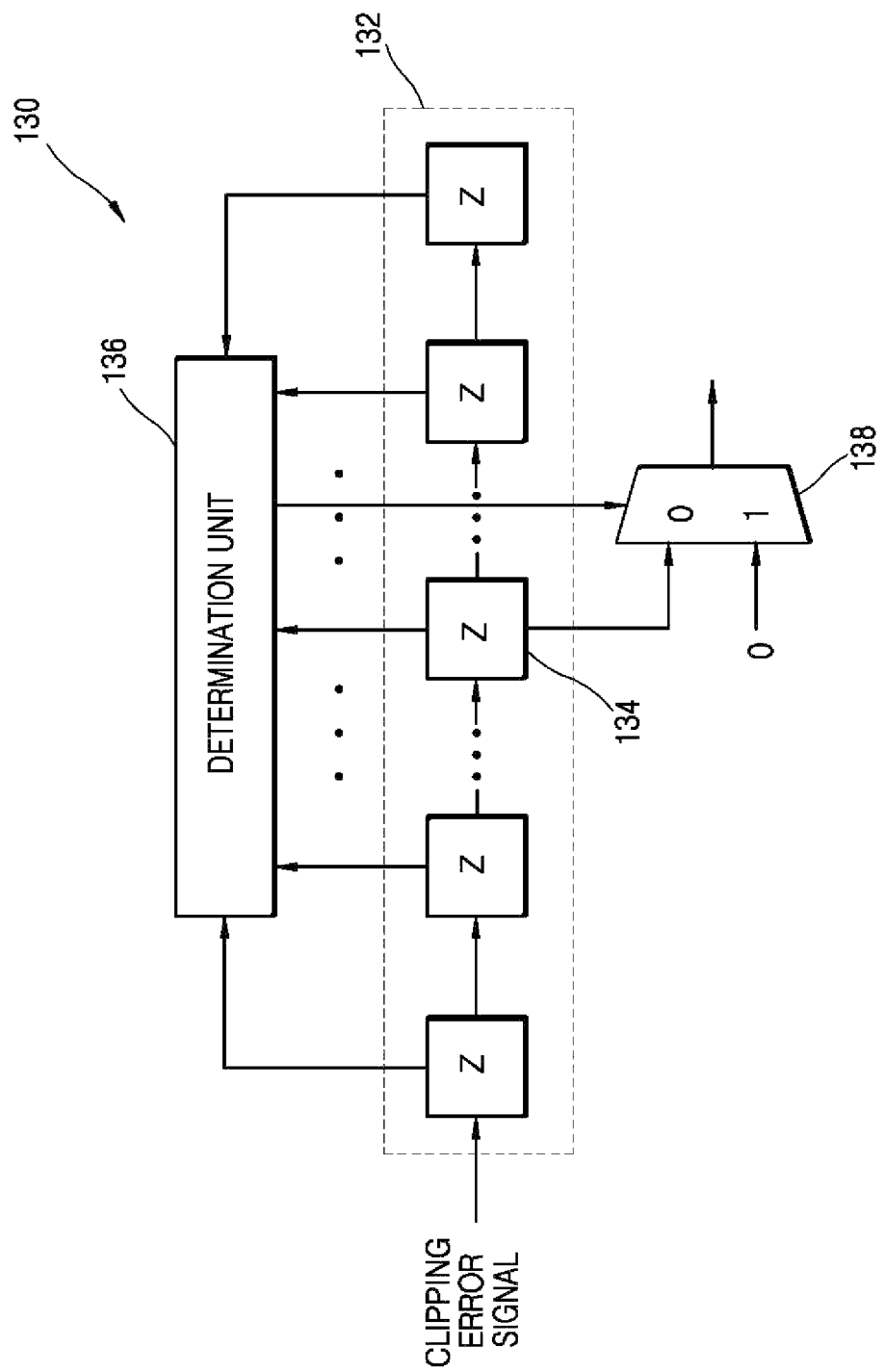
FIG. 3 is a detailed view of a peak value determination unit in FIG. 1.

FIG. 3 is a detailed view of the peak value determination unit 130 in FIG. 1.

Referring to FIG. 3, the peak value determination unit 130 may include odd-numbered flip-flops 132, a determination unit 136, and a 2:1 multiplexer 138. The flip-flops 132 may be three, but the number of flip-flops 132 may differ depending on input signals.

The odd-numbered flip-flops 132 receive odd-numbered amplitude values included in a clipping error signal in time sequence. The odd-numbered flip-flops 132 may be implemented by a shift register.

The determination unit 136 determines a first amplitude value as a peak value when a magnitude of the first amplitude value stored in a flip-flop 134 located in the middle of the odd-numbered flip-flops 132 is the greatest. Furthermore, the determination unit 136 may compare amplitude values stored in the odd-numbered flip-flops 132 with each other, and may input a control signal according to the comparison result to the 2:1 multiplexer 138.

The 2:1 multiplexer 138 may receive the first amplitude value, which is stored in the flip-flop 134 located in the middle of the odd-numbered flip-flops 132, and 0.

When a magnitude of the first amplitude value stored in the flip-flop 134 is the greatest, the determination unit 136 may transmit a control signal for outputting the first amplitude value from the 2:1 multiplexer 138 to the CPG allocation unit 140 to the 2:1 multiplexer 138. On the other hand, when a magnitude of the first amplitude value stored in the flip-flop 134 is not the greatest, the determination unit 136 may transmit a control signal for outputting 0 from the 2:1 multiplexer 138 to the CPG allocation unit 140 to the 2:1 multiplexer 138.

The peak value determination unit 130 of FIG. 3 is only an example, and may be implemented such that an amplitude value stored in any one of the odd-numbered flip-flops is output from the 2:1 multiplexer connected to the any one of the odd-numbered flip-flops when the 2:1 multiplexer is connected to each of the odd-numbered flip-flops and the amplitude value stored in the any one of the odd-numbered flip-flops is greater than amplitude values stored in flip-flops located before and after the any one of the odd-numbered flip-flops.

Meanwhile, the peak value determination unit 130 of FIG. 3 may be used for all CFRs such as an error shaping filter (ESF), peak windowing (PWF), or feedback peak windowing (FPW) in addition to the PC-CFR device.

Figure 4:
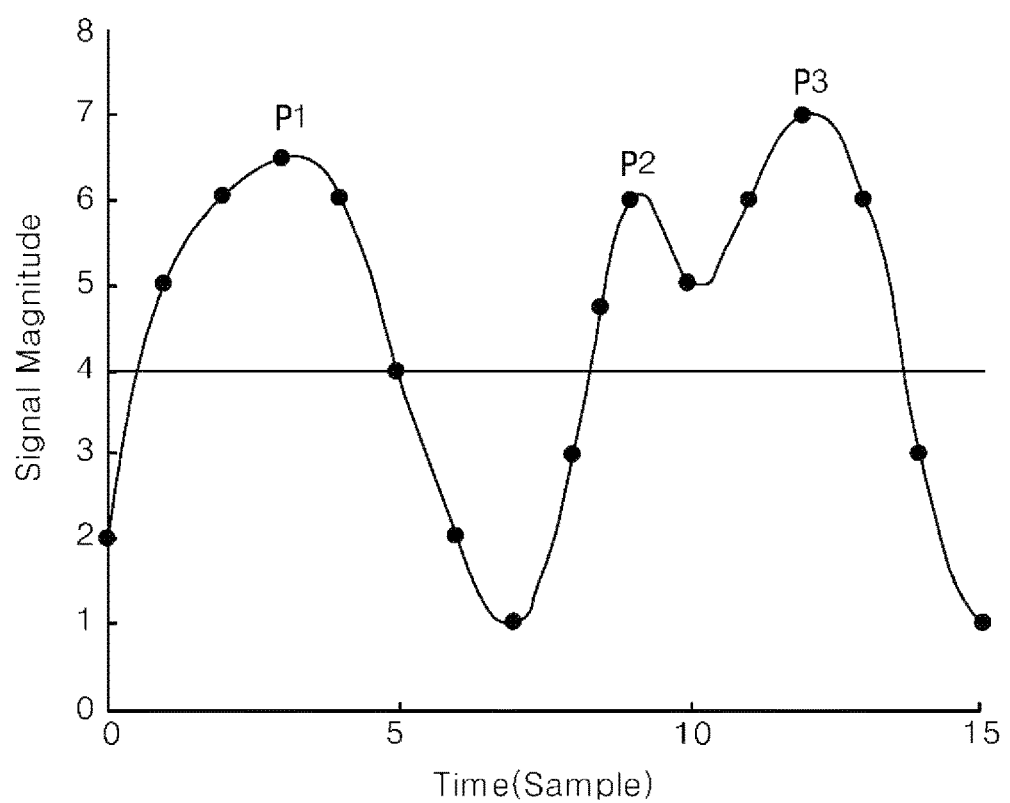
FIG. 4 is a view for explaining a difference in effect between a conventional PC-CFR device and a PC-CFR device according to an example embodiment of the inventive concept.

FIG. 4 is a view for explaining a difference in effect between a conventional PC-CFR device and a PC-CFR device according to an example embodiment of the inventive concept.

As described above, since the conventional PC-CFR device determines only the maximum value among sets of amplitude values that remain above a threshold as a peak value, amplitude value P2 among amplitude values that remain 4 or more may not be detected as a peak value. This is because the conventional PC-CFR device will determine only amplitude value P3, which is the maximum value among sets of amplitude values including amplitude values P2 and P3, as a peak value. Meanwhile, the PC-CFR device according to an example embodiment of the inventive concept may detect not only amplitude values P1 and the P3 but also amplitude value P2 as a peak value.

Figure 5:
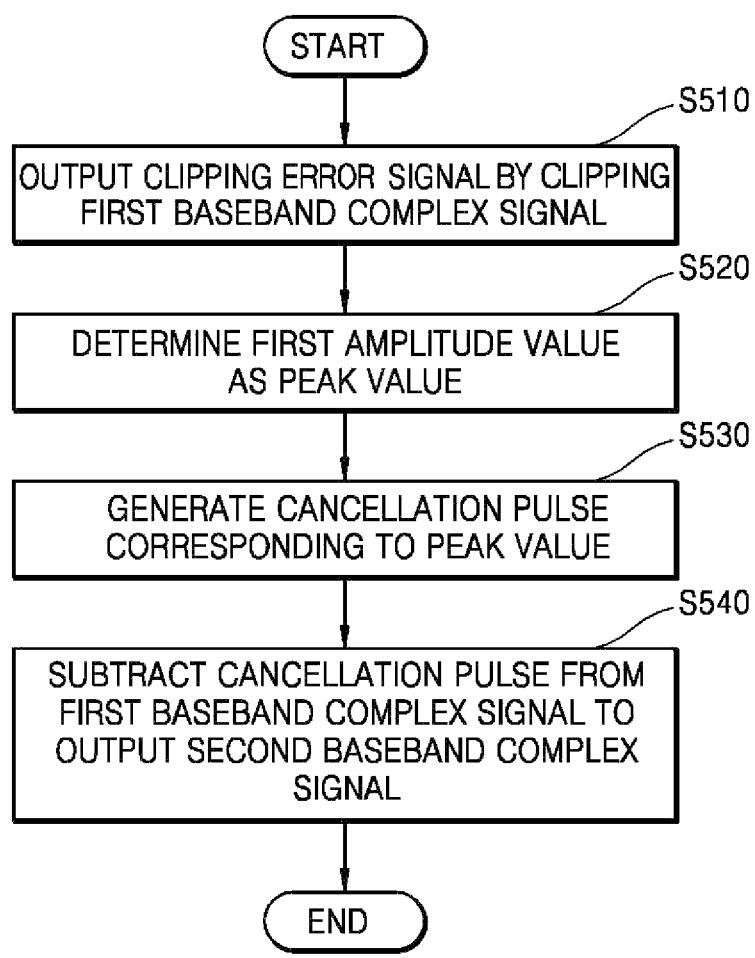
FIG. 5 is a flowchart of a peak-to-average power ratio (PAPR) reduction method according to another example embodiment of the inventive concept.

FIG. 5 is a flowchart of a PAPR reduction method according to another example embodiment of the inventive concept. Referring to FIG. 5, the PAPR reduction method according to another example embodiment of the inventive concept includes operations of time-series processing in the PC-CFR device of FIG. 1. Therefore, even if the descriptions are omitted below, the contents described above with respect to the PC-CFR device of FIG. 1 may also be applied to the PAPR reduction method of FIG. 5.

In operation S510, the PC-CFR device outputs a clipping error signal by clipping a first baseband complex signal The PC-CFR device inputs a threshold value in which a phase of the first baseband complex signal is reflected and a first baseband complex signal to the 2:1 multiplexer 118, and may generate a clipping signal by selectively outputting the threshold value in which the phase of the first baseband complex signal is reflected and the first baseband complex signal according to a comparison result of a magnitudes between the threshold value and the first baseband complex signal.

The PC-CFR device may cancel the clipping signal from the first baseband complex signal and output the clipping error signal.

In operation S520, the PC-CFR device may determine a first amplitude value as a peak value when the first amplitude value is greater than amplitude values input before and after the first amplitude value among a plurality of amplitude values included in the clipping error signal.

In operation S530, the PC-CFR device generates a cancellation pulse corresponding to the peak value.

In operation S540, the PC-CFR device subtracts the cancellation pulse from the first baseband complex signal to output a second baseband complex signal with a reduced PAPR.

Figure 6:
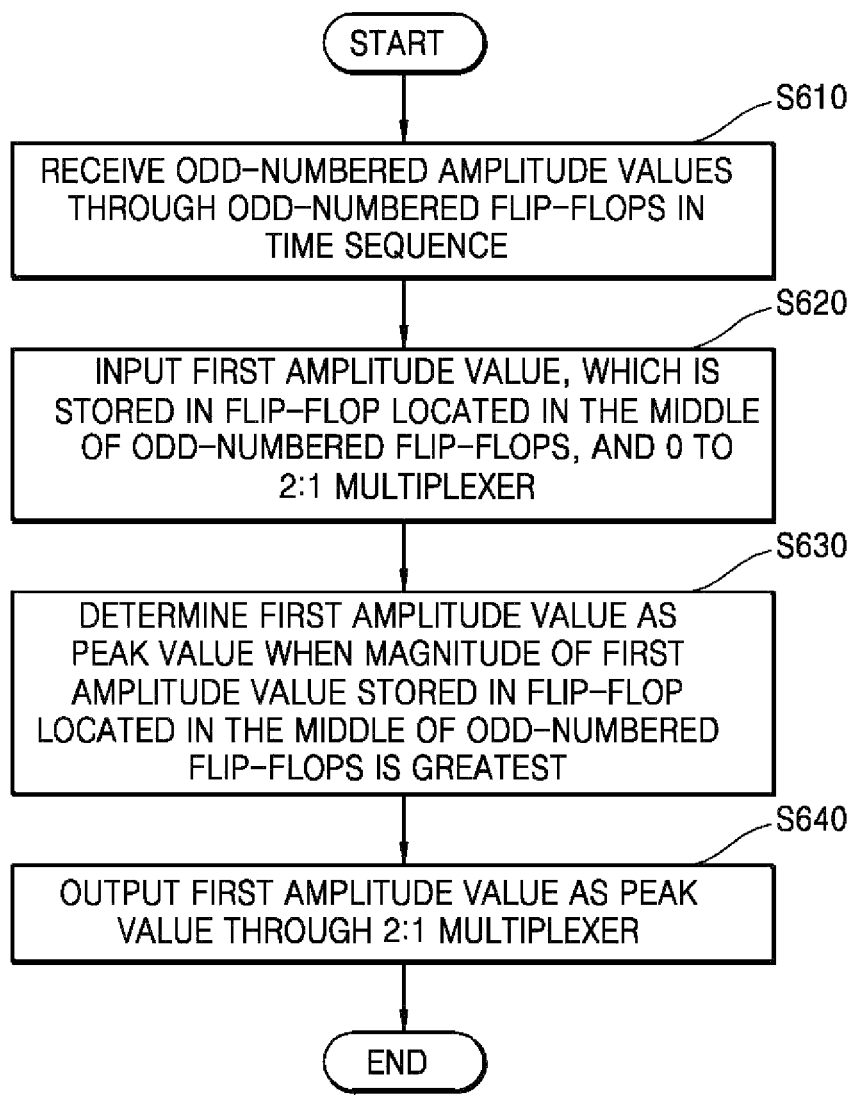
FIG. 6 is a detailed flowchart of operation S520 in FIG. 5.

FIG. 6 is a detailed flowchart of operation S520 in FIG. 5.

In operation S610, the PC-CFR device receives odd-numbered amplitude values included in the clipping signal through the odd-numbered flip-flops 132 in time sequence.

In operation S620, the PC-CFR device inputs the first amplitude value, which is stored in the flip-flop 134 located in the middle of the odd-numbered flip-flops 132, and 0 to the 2:1 multiplexer 138.

In operation S630, the PC-CFR device determines a first amplitude value as a peak value when a magnitude of the first amplitude value stored in the flip-flop 134 located in the middle of the odd-numbered flip-flops 132 is the greatest.

In operation S640, when a magnitude of the first amplitude value is the greatest, the PC-CFR device transmits a control signal to the 2:1 multiplexer 138 to output the first amplitude value as a peak value through the 2:1 multiplexer 138.

The example embodiments of the inventive concept can be written as computer programs and can be implemented in general-use digital computers that execute the programs using a computer readable recording medium.

The computer readable recording medium may be a magnetic storage medium (e.g., a ROM, a floppy disk, a hard disk, etc.), an optical reading medium (e.g., a CD ROM, a DVD or the like), and a carrier wave (e.g., transmission over the Internet).

While one or more example embodiments have been described with reference to the figures, it will be understood by those of ordinary skill in the art that various changes in form and details may be made therein without departing from the spirit and scope of the disclosure as defined by the following claims.

What is claimed is:

1. A peak cancellation-crest factor reduction (PC-CFR) device comprising at least one processor to implement:
    a clipping unit configured to output a clipping error signal including a plurality of amplitude values by clipping amplitude values of a first baseband complex signal based on a predetermined threshold value;
    a peak value determination unit configured to receive the clipping error signal, and determine a first amplitude value as a peak value when the first amplitude value is greater than a second amplitude value input before the first amplitude value and a third amplitude value input after the first amplitude value, wherein the first amplitude value, the second amplitude value, and third amplitude value appear in the clipping error signal sequentially in time;
    a cancellation pulse generator (CPG) allocation unit configured to allocate the peak value to a CPG; and
    a subtractor configured to subtract a cancellation pulse generated from the CPG from the first baseband complex signal and output a second baseband complex signal with a reduced peak-to-average power ratio (PAPR).

2. The PC-CFR device of claim 1, wherein the peak value determination unit comprises:
    odd-numbered flip-flops receiving the plurality of amplitude values included in the clipping error signal in time sequence; and
    a determination unit configured to determine the first amplitude value as the peak value when a magnitude of the first amplitude value stored in a flip-flop located in the middle of the odd-numbered flip-flops is the greatest.

3. The PC-CFR device of claim 2, wherein
    the peak value determination unit comprises a 2:1 multiplexer receiving the first amplitude value, which is stored in the flip-flop located in the middle of the odd-numbered flip-flops, and 0, wherein
    the peak value determination unit is configured to output a control signal for controlling the 2:1 multiplexer such that the first amplitude value is output from the 2:1 multiplexer to the CPG allocation unit when a magnitude of the first amplitude value is the greatest.

4. The PC-CFR device of claim 1, wherein the clipping unit comprises:
    a comparison unit configured to compare a magnitude of the first baseband complex signal with the threshold value;
    a CORDIC unit configured to output a phase signal corresponding to a phase of the first baseband complex signal;
    a multiplier configured to multiply the threshold value and the phase signal; and
    a 2:1 multiplexer configured to receive the first baseband complex signal and the threshold value multiplied by the phase signal, wherein
    the comparison unit is configured to transmit a control signal to the 2:1 multiplexer based on the comparison result so that the 2:1 multiplexer selectively outputs the first baseband complex signal and the threshold value multiplied by the phase signal.

5. The PC-CFR device of claim 4, wherein
    the 2:1 multiplexer outputs a clipping signal including at least portion of the first baseband complex signal and the threshold value multiplied by the phase signal,
    wherein the clipping unit further comprises:
    a subtractor configured to subtract the clipping signal from the first baseband complex signal and output the clipping error signal.

6. A peak-to-average power ratio (PAPR) reduction method, the PAPR reduction method comprising:
    outputting a clipping error signal including a plurality of amplitude values by clipping amplitude values of a first baseband complex signal based on a predetermined threshold value;
    determining a first amplitude value as a peak value when the first amplitude value is greater than amplitude values input before and after the first amplitude value, wherein the first amplitude value, the second amplitude value, and third amplitude value appear in the clipping error signal sequentially in time;
    generating a cancellation pulse corresponding to the peak value; and
    subtracting the cancellation pulse from the first baseband complex signal to output a second baseband complex signal with a reduced PAPR.

7. The PAPR reduction method of claim 6, wherein the determining the first amplitude value as a peak value comprises:
    receiving the plurality of amplitude values included in the clipping error signal through odd-numbered flip-flops; and
    determining the first amplitude value as the peak value when a magnitude of the first amplitude value stored in a flip-flop located in the middle of the odd-numbered flip-flops is the greatest.

8. The PAPR reduction method of claim 7, wherein the determining the first amplitude value as a peak value comprises:
    inputting the first amplitude value, which is stored in the flip-flop located in the middle of the odd-numbered flip-flops, and 0 to a 2:1 multiplexer; and
    outputting the first amplitude value as the peak value through the 2:1 multiplexer when a magnitude of the first amplitude value is the greatest.

9. The PAPR reduction method of claim 6, wherein the outputting the clipping error signal comprises:
    outputting a phase signal corresponding to a phase of the first baseband complex signal; and
    multiplying the threshold value and the phase signal;
    receiving the first baseband complex signal and the threshold value multiplied by the phase signal;
    comparing a magnitude of the first baseband complex signal with the threshold value;

outputting selectively the first baseband complex signal and the threshold value multiplied by the phase signal as a clipping signal based on the comparison result; and outputting the clipping error signal by subtracting the clipping signal from the first baseband complex signal.

10. A peak value determination device comprising at least one processor to implement:

a plurality of flip-flops configured to receive a plurality of amplitude values included in a predetermined signal in time sequence; and a determination unit configured to determine a first amplitude value as a peak value when the first amplitude value is greater than a second amplitude value input before the first amplitude value and a third amplitude value input after the first amplitude value among the plurality of amplitude values stored in the plurality of flip-flops, wherein the first amplitude value, the second amplitude value, and third amplitude value appear in the predetermined signal sequentially in time.

11. The peak value determination device of claim 10, wherein the plurality of flip-flops are odd, and the peak value determination unit further includes a 2:1 multiplexer receiving the first amplitude value, which is stored in a flip-flop located in the middle of the odd-numbered flip-flops, and 0, wherein the determination unit is configured to output a control signal for controlling the 2:1 multiplexer such that the first amplitude value is output from the 2:1 multiplexer when a magnitude of the first amplitude value is the greatest.

* * * * *